Feb. 16, 1954      H. O. AUGUSTIN      2,669,280
METHOD OF MAKING V BELTS
Filed Nov. 8, 1951

INVENTOR.
HAROLD O. AUGUSTIN
BY
R. L. Miller
ATTORNEY

Patented Feb. 16, 1954

2,669,280

UNITED STATES PATENT OFFICE 2,669,280

METHOD OF MAKING V-BELTS

Harold O. Augustin, Lincoln, Nebr., assignor, by mesne assignments, to The Goodyear Tire & Rubber Company, a corporation of Ohio Application November 8, 1951, Serial No. 255,448

7 Claims. (Cl. 154—4)

This invention relates to a novel method of building power transmission belts. More particularly the invention pertains to an improved method of building power transmission belts of trapezoidal cross-section, commonly referred to as V-belts.

This invention provides an improvement over the present methods of manufacturing V-belts, not only in minimizing the required handling during the fabricating processes but also in effecting a substantial reduction in the quantities of scrap or waste material produced by the usual methods.

In the past, numerous methods have been proposed for manufacturing V-belts but relatively few of these methods have been adopted in commercial practices as the majority of them have not been adaptable to mass production of V-belts.

Power transmission belts of the V-type usually consist of two basic elements, namely, the body portion and the envelope. The body portion, in turn, has a compression section, a neutral axis section, and a tension section. The body of the belt is generally fabricated from the various elements into a composite structure which is then enveloped with the bias-cut strip of square-woven fabric before vulcanization. There are several well-known methods of fabricating a multiplicity of body portions simultaneously and this invention is particularly well adapted to be employed in fabricating V-belt bodies.

One of the most widely used methods of fabrication of the body portion of a V-belt is to laminate or ply-up in the form of a sleeve, the various components or elements on a drum. Next, the sleeve is cut up into a plurality of endless strips to provide a multiplicity of V-belt bodies of trapezoidal cross-section. This step is generally referred to as the "trap" cutting operation. Each V-belt body usually includes the compression section of unvulcanized rubber, tension elements, insulating gum for the tension elements and, in some constructions, fabric as a reinforcing material. The V-belt bodies thus formed are then provided with a fabric envelope and vulcanized to produce the finished belt.

In the "trap" cutting operation, a wedge-shaped remnant of the sleeve having portions of the various elements is formed between the adjacent V-belt bodies. Inasmuch as this wedge is not suitable for use in that form, it is generally scrapped or salvaged by separating it into the various elements for later reprocessing. Either of these steps necessarily affect production costs.

Another well-known method of building V-belts comprises building a sleeve of the elements forming the neutral axis portion of the belt on a drum and cutting the sleeve into endless bands of the required width. The V-belt body is then completed by removing the bands from the drum and applying the compression section of the belt to each of the bands individually, the compression section generally being an extruded strip of unvulcanized rubber of a cross-section comparable to that of the finished belt. The envelope is then applied and the belt vulcanized in the usual manner.

This latter method eliminates the waste or salvage material but requires considerable handling and time to apply the compression section to the belt. It is also very probable that the cross-section of the compression section will be non-uniform around the circumference of the belt due to normal handling during this portion of the building operation.

It is therefore a particular object of this invention to provide a method of manufacturing V-belts which reduces the necessary handling and eliminates waste.

Another object of this invention is to provide a simple and inexpensive method of manufacturing V-belts.

A further object of this invention is to provide a method of manufacturing V-belts in which the V-belt bodies are of a uniform cross section throughout their lengths.

A still further object of this invention is to provide a method of manufacturing V-belts that can be adapted readily for use with the present equipment and methods.

Other objects and advantages of this invention will become apparent hereinafter as the description hereof proceeds and the novel features, arrangements and combinations being clearly pointed out in the specification, as well as the claims hereunto appended.

Figure 1:
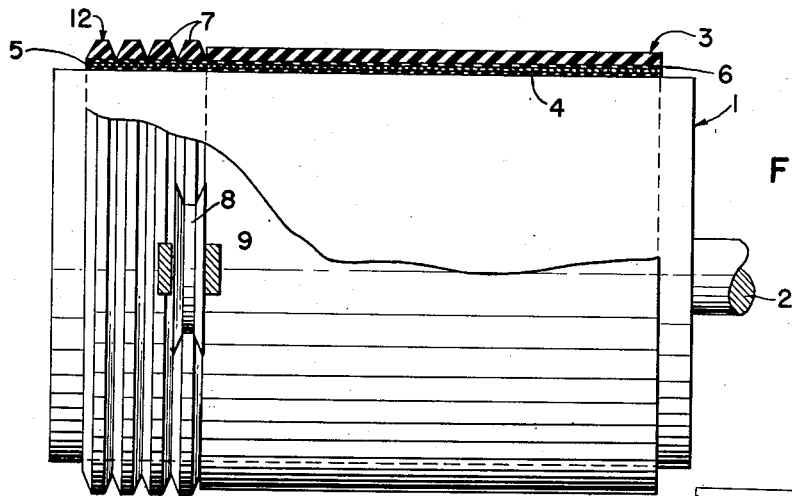
Fig. 1 is an elevational view of the apparatus used in the invention.

In the drawings the building drum 1 is mounted on shaft 2 which is adapted to be rotated by driving means (not shown). The sleeve or composite 3 is fabricated on the drum 1 according to the usual practices and, for example, may include a layer 4 of insulating gum on which the tension elements 5 are helically wound. The tension elements 5 may be of any desired material such as wire, cotton, rayon, nylon, or any other similar material.

If desired, another layer 6 of insulating gum may be applied to the tension elements 5 before the compression layer 7, preferably of unvulcanized rubber, is applied to form the composite 3. Generally the compression layer 7 is formed by applying a sufficient number of layers of calendered sheets of rubber to produce the required thickness.

In the practice of the invention, the volume of layers 7 as applied shall be substantially equal to the total volume of the compression sections of the bodies of the belts formed by the sleeve. As a result, the outside diameter of the sleeve is slightly less than the diameter of the formed belt to allow for the outward movement of the compression layer 7 during the reshaping operation as explained below. If desired, the various elements making up the sleeve may be rolled or stitched together to eliminate trapped air before further steps are taken.

Figures 2, 4, 5:
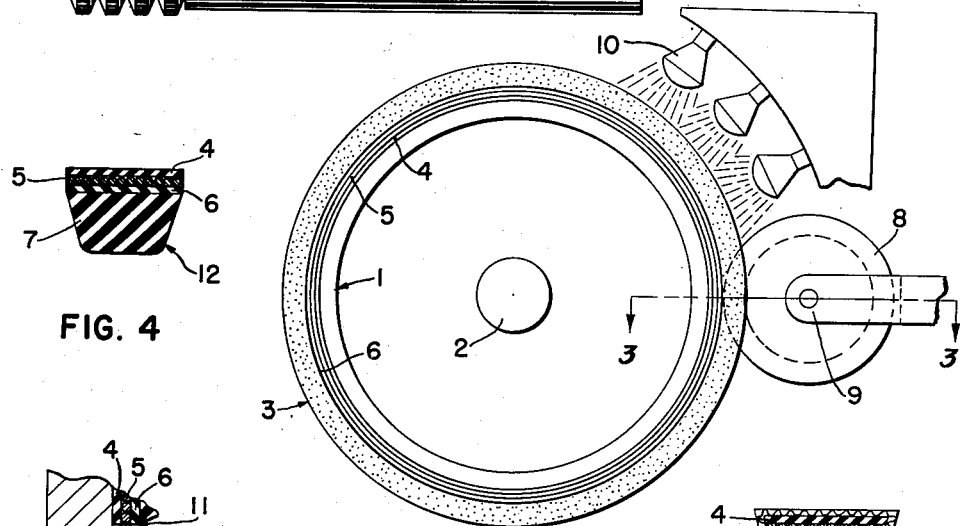
Fig. 2 is an end view of the apparatus.
Fig. 4 is a sectional view of the body portion of a typical V-belt as produced by the invention.
Fig. 5 is a sectional view of a typical finished V-belt.
Figure 3:
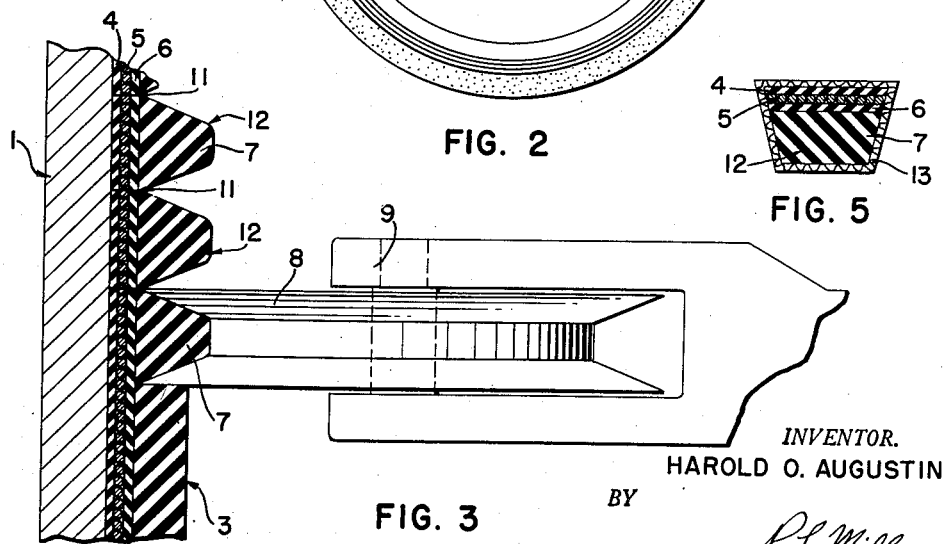
Fig. 3 is an enlarged sectional view taken along the line 3—3 of Fig. 2.

After the sleeve or composite 3 is formed, a forming roll 8 rotatably mounted on shaft 9 and having a peripheral groove of a cross-section comparable in shape and size to that on the V-belt body, or of any other desired shape and size that may be determined, is brought into contact with and pressed against the sleeves. As the drum 3 is rotated slowly, the roll 8 is caused to rotate by frictional contact and reshape the compression layer 7 to conform to the shape of the surface of the roll 8 as shown in Figs. 2 and 3. The forming roll 8, as shown, contains only one groove but may be made to include any number of grooves if desired so that a comparable number of V-belt bodies will be formed simultaneously.

According to the method of the invention shown and described herein, after one portion of the compression layer 7 is reshaped, the roll 8 is moved axially along the drum until the edge of the roll coincides with the bottom of the adjacent, previously formed groove and then the roll is again forced into the compression layer 7 and the drum 1 and roll 8 rotated to form another V-belt body. This is repeated across the entire length of the sleeve so that a series of V-belt bodies are formed, providing a corrugated appearance to the surface of the sleeve, each corrugation being a V-belt body. In the forming operation, the compression section of substantially rectangular cross-section is reshaped to a substantially trapezoidal cross-section comparable to that of the finished belt but slightly smaller in size so as to allow for thickness of the envelope fabric.

The unvulcanized rubber used to form the compression section of the belt in many instances is somewhat resilient, even though it is unvulcanized, so that it is desirable that this resiliency be "killed" in order that it will retain its shape after forming and not tend to return to its original shape. One method of accomplishing this is to heat the unvulcanized rubber to a temperature preferably below the point at which vulcanization takes place but one at which the rubber is softened so that it is easily and permanently reshaped. A temperature of 150° F. has been found to be satisfactory for this purpose.

Infra-red heat has been found to be a very quick, efficient method of heating the compression layer 7 to the desired temperature before reshaping and the bank 10 of infra-red lights is mounted adjacent the building drum 1 so that the heat from the lights will be directed against the sleeve and it is only necessary to rotate the drum slowly to heat the entire compression section 7 to the desired temperature. Other suitable means may be used to heat the sleeve before reshaping such, for example, as placing the drum and sleeve in a heated oven for a period of time sufficient to induce heat in the sleeve to the desired temperature before the shaping operation.

After the compression section of the sleeve 3 has been reshaped, the sleeve is then severed at the bottom of each corrugation, as indicated by the straight line 11 in Fig. 3 to provide a series of V-belt bodies 12 having a cross-section similar to that illustrated in Fig. 4.

Another method of practicing the invention is to prepare the sleeve or composite 3 by fabricating on a drum a first sleeve of the elements of the neutral axis section which may include, for example, the layer of insulating gum 4, the tension elements 5 and the layer of insulating gum 6. The compression layer of unvulcanized rubber is separately built up as a second sleeve on another drum and then reshaped to provide a series of corrugations of the desired cross-section, size and shape as previously described. The second sleeve is then applied over the first sleeve to form the composite 3 and, if desired, a cement or adhesive to increase the adhesion between the first sleeve and the second sleeve may be applied to the surface of the first sleeve before the second sleeve is placed in position. The composite 3 then is severed at the bottom of each corrugation to provide a series of V-belt bodies 12.

The bodies 12 are removed from the drum and the fabric envelope 13 is then applied according to any of the well-known methods. The enveloped belt is then subjected to heat and pressure according to any of the well-known practices to vulcanize the rubber and unite the various parts of the belt into a component structure.

While certain representative embodiments and details have been shown for the purpose of illustrating the invention, it will be apparent to those skilled in this art that various changes and modifications may be made therein without departing from the spirit or scope of the invention.

Having thus fully described my invention, what I claim and desire to secure by Letters Patent of the United States is:

1. In the method of manufacturing the body portion of a V-belt including the steps of forming a sleeve incorporating several essential components of the belt including the tension elements and the compression portion of unvulcanized rubber which eliminates the waste normally encountered in cutting V-belt bodies from said sleeve, said method comprising reshaping the compression portion into a multiplicity of mutually parallel corrugations of a cross-section approximating that of the belt, and severing the sleeve at the bottom of said corrugations to produce a multiplicity of V-belt body portions.

2. In the method of manufacturing the body portion of a V-belt including the steps of forming a sleeve incorporating several essential components of the belt including the tension elements and the compression portion of unvulcanized rubber which eliminates the waste normally encountered in cutting V-belt bodies from said sleeve, said method comprising substantially uniformly heating at a temperature less than the vulcanization temperature the compression portion to kill the resilience of said compression portion, reshaping the compression portion into a multiplicity of mutually parallel corrugations of a cross-section approximating that of the belt, and severing the sleeve at the bottom of said corrugations to produce a multiplicity of V-belt body portions.

3. In the method of manufacturing the body portion of a V-belt including the steps of forming a sleeve incorporating several essential components of the belt including the tension elements and the compression portion of unvulcanized rubber which eliminates the waste normally encountered in cutting V-belt bodies from said sleeve, said method comprising substantially uniformly heating the compression member to approximately 150° F., reshaping the compression portion into a multiplicity of mutually parallel corrugations of a cross-section approximating that of the belt, and severing the sleeve at the bottom of said corrugations to produce a multiplicity of V-belt body portions.

4. In the method of manufacturing the body portion of a V-belt including the steps of forming a sleeve incorporating several essential components of the belt including the tension elements and the compression portion of unvulcanized rubber which eliminates the waste normally encountered in cutting V-belt bodies from said sleeve, said method comprising substantially uniformly heating the compression member to approximately 150° F. by means of infra-red heat, reshaping the compression portion into a multiplicity of mutually parallel corrugations of a cross-section approximating that of the belt, and severing the sleeve at the bottom of said corrugations to produce a multiplicity of V-belt body portions.

5. In the method of manufacturing V-belts having a body portion enveloped in fabric including the steps of forming a sleeve incorporating several essential components of the belt including a neutral axis section with the tension elements contained therein and a compression section of a layer of unvulcanized rubber which eliminates the waste normally encountered in cutting the V-belt bodies from said sleeve, said method comprising heating the layer of unvulcanized rubber to soften said layer, permanently reshaping the compression portion into a multiplicity of mutually parallel corrugations of a cross-section of substantially the same size and shape as that of the compression section of the finished belt, severing the sleeve at the bottom of said corrugations to produce a multiplicity of V-belt body portions, applying the fabric envelope to said body portions and subjecting the enveloped bodies to heat and pressure to unite the component parts of the belt into an integral structure and vulcanize the rubber.

6. In the method of manufacturing V-belts having a body portion including the steps of forming a sleeve incorporating several essential components of the belt including a neutral axis section with the tension elements contained therein and a compression section of a layer of unvulcanized rubber which eliminates the waste normally encountered in cutting the V-belt bodies from said sleeve, said method comprising forming a first sleeve of the elements of the neutral axis portion of the belt body including the tension elements, separately forming a second sleeve of unvulcanized rubber, reshaping the second sleeve into a multiplicity of mutually parallel corrugations, applying said reshaped second sleeve over said first sleeve to form a composite, and severing said composite at the bottom of the corrugations to produce a multiplicity of V-belt body portions.

7. In the method of manufacturing V-belts having a body portion including the steps of forming a sleeve incorporating several essential components of the belt including a neutral axis section with the tension elements contained therein and a compression section of a layer of unvulcanized rubber which eliminates the waste normally encountered in cutting the V-belt bodies from said sleeve, said method comprising forming a first sleeve of the elements of the neutral axis portion of the belt body including the tension elements, separately forming a second sleeve of unvulcanized rubber, reshaping the second sleeve into a multiplicity of mutually parallel corrugations, applying an adhesive to the exposed surface of said first sleeve, applying said reshaped second sleeve over said first sleeve to form a composite, and severing said composite at the bottom of the corrugations to produce a multiplicity of V-belt body portions.

HAROLD O. AUGUSTIN.

References Cited in the file of this patent

UNITED STATES PATENTS

| Number | Name | Date |
|---|---|---|
| 1,921,456 | DeLaney | Aug. 8, 1933 |
| 2,077,508 | Bierer | Apr. 20, 1937 |
| 2,221,984 | McKay | Nov. 19, 1940 |
| 2,366,084 | Freedlander | Dec. 7, 1943 |

FOREIGN PATENTS

| Number | Country | Date |
|---|---|---|
| 2,939 | Great Britain | 1903 |